(12) United States Patent
Mao et al.

(10) Patent No.: US 11,745,535 B2
(45) Date of Patent: Sep. 5, 2023

(54) GROOVE ENGRAVING DEVICE AND GROOVE ENGRAVING METHOD

(71) Applicant: LONGI GREEN ENERGY TECHNOLOGY CO., LTD., Xi'an (CN)

(72) Inventors: Jianbo Mao, Xi'an (CN); Jie Li, Xi'an (CN); Pengfei Dang, Xi'an (CN)

(73) Assignee: LONGI GREEN ENERGY TECHNOLOGY CO., LTD., Xi'an (CN)

( * ) Notice: Subject to any disclaimer, the term of this patent is extended or adjusted under 35 U.S.C. 154(b) by 0 days.

(21) Appl. No.: 17/838,296

(22) Filed: Jun. 13, 2022

(65) Prior Publication Data

US 2022/0402295 A1 Dec. 22, 2022

(30) Foreign Application Priority Data

Jun. 18, 2021 (CN) .......................... 202110680356.4

(51) Int. Cl.
*B44B 3/00* (2006.01)
*B44B 3/04* (2006.01)
(Continued)

(52) U.S. Cl.
CPC ............... *B44B 3/008* (2013.01); *B26D 1/02* (2013.01); *B26D 3/06* (2013.01); *B44B 3/04* (2013.01);
(Continued)

(58) Field of Classification Search
CPC ........... B44B 3/008; B44B 3/04; B44B 3/065; B44B 2700/025; B44B 2700/12;
(Continued)

(56) References Cited

U.S. PATENT DOCUMENTS 2,703,455 A * 3/1955 Green ..................... B44B 3/002
409/86
4,136,453 A * 1/1979 Levine ..................... B44B 3/04
33/24.2
(Continued)

FOREIGN PATENT DOCUMENTS

| CN | 102166791 B | 10/2014 |
|---|---|---|
| CN | 207128104 U | 3/2018 |
| JP | 4027856 B2 | 12/2007 |

*Primary Examiner* — Ryan J. Walters
(74) *Attorney, Agent, or Firm* — Bayramoglu Law Offices LLC

(57) ABSTRACT

A groove engraving device and a groove engraving method are provided. The groove engraving device includes: a processing chamber for containing a piece to be processed, a cutter for groove engraving on the piece to be processed, a clamping mechanism for clamping the piece to be processed, a driving mechanism for driving the clamping mechanism to rotate, and a temperature controlling device for controlling a temperature inside the processing chamber to be within a preset temperature range. The clamping mechanism and the cutter are disposed inside the processing chamber, and the clamping mechanism is rotatable with respect to the processing chamber. The temperature controlling device is disposed inside the processing chamber. The groove engraving device can improve the processing efficiency and quality of the groove engraving on the piece to be processed.

13 Claims, 4 Drawing Sheets

(51) Int. Cl.
*B44B 3/06* (2006.01)
*B26D 1/02* (2006.01)
*B26D 3/06* (2006.01)
B26D 1/00 (2006.01)
B26D 5/00 (2006.01)
B26D 5/02 (2006.01)
B26D 7/01 (2006.01)

(52) U.S. Cl.
CPC ............... *B44B 3/065* (2013.01); *B26D 5/00* (2013.01); *B26D 5/02* (2013.01); *B26D 7/01* (2013.01); *B26D 2001/0053* (2013.01); *B44B 2700/025* (2013.01); *B44B 2700/12* (2013.01)

(58) Field of Classification Search
CPC ... B26D 1/02; B26D 3/06; B26D 5/00; B26D 5/02; B26D 7/01; B26D 2001/0053; B26D 7/088; B26D 2210/00
See application file for complete search history.

(56) References Cited

U.S. PATENT DOCUMENTS 5,253,579 A * 10/1993 Yoshii ................. B41C 1/02
101/401.1
2001/0026741 A1 * 10/2001 Lorber ................. B27F 1/04
409/137

* cited by examiner

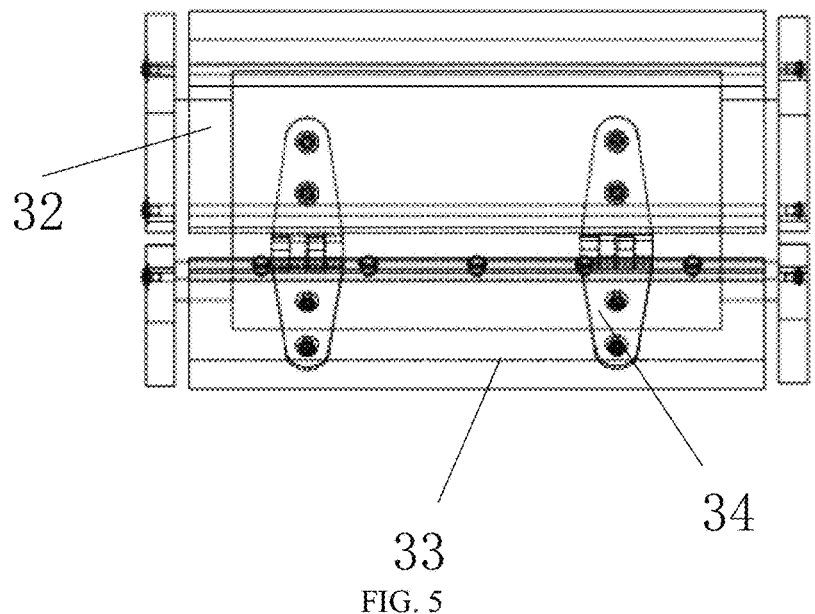

FIG. 5

| clamping a piece to be processed by using a clamping mechanism rotating with respect to the processing chamber | 101 |

↓

| controlling a temperature inside the processing chamber to be within a preset temperature range by using a temperature controlling device | 102 |

↓

| driving the piece to be processed at the clamping mechanism to rotate by using a driving mechanism, to engrave a groove on the piece to be processed through the cutter | 103 |

FIG. 6

GROOVE ENGRAVING DEVICE AND GROOVE ENGRAVING METHOD

CROSS REFERENCE TO THE RELATED APPLICATIONS

This application is based upon and claims priority to Chinese Patent Application No. 202110680356.4, filed on Jun. 18, 2021, the entire contents of which are incorporated herein by reference.

TECHNICAL FIELD

The present disclosure relates to the technical field of silicon wafer cutting, and particularly relates to a groove engraving device and a groove engraving method.

BACKGROUND

With the development of the photovoltaic industry, the requirements on the photovoltaic slicing technique are increasingly higher. In the prior art, a diamond wire is usually arranged on a home roll for slicing the silicon with the diamond wire. It is usually required to machine an accommodation groove in the home roll and wrap the diamond wire in the accommodation groove to complete the wiring on the home roll. In the prior art, the accommodation groove is usually processed on a coating layer of the home roll.

However, in the prior art, the coating layer of the home roll is usually made of polyurethane-resin which has a low hardness at room temperature environment. When an accommodation groove is cut on the coating layer of the home roll with a cutter, the coating layer is easily deformed and requires multiple processing times. As shown in FIG. 1, the cutter feed for three times, the first feed is 0.08-0.14 mm for the first groove engraving; the second feed is 0.16-0.28 mm for the second groove engraving, and the third feed is 0.16-0.28 mm for trimming the groove shape. The cutter needs to feed for three times to engrave one accommodation groove, and the duration for processing one accommodation groove is approximately 7 seconds. In the prior art, the processing time of the accommodation groove is long, and the efficiency of processing is low. Furthermore, polyurethane resin, which remains at the groove bottom of the accommodation groove, cannot be cut off easily, which results in a poor processing quality of the accommodation groove.

SUMMARY

In view of the above problems, the embodiments of the present disclosure are proposed to provide a groove engraving device and a groove engraving method that can overcome the above problems or at least partially solve the above problems.

In order to solve the above problems, in a first aspect, an embodiment of the present disclosure discloses a groove engraving device, wherein the groove engraving device comprises: a processing chamber for containing a piece to be processed, a cutter for groove engraving on the piece to be processed, a clamping mechanism for clamping the piece to be processed and a driving mechanism for driving the clamping mechanism to rotate, wherein both of the clamping mechanism and the cutter are disposed inside the processing chamber, and the clamping mechanism is rotatable with respect to the processing chamber; and the groove engraving device further comprises: a temperature controlling device for controlling a temperature inside the processing chamber to be within a preset temperature range, wherein the temperature controlling device is disposed inside the processing chamber.

Optionally, the preset temperature range is from minus 10 degrees Celsius to minus 4 degrees Celsius.

Optionally, the temperature controlling device comprises: a temperature sensor for detecting the temperature inside the processing chamber, a refrigerating mechanism for regulating the temperature inside the processing chamber and a controller for controlling the refrigerating mechanism to operate; and all of the temperature sensor, the refrigerating mechanism and the controller are disposed inside the processing chamber, and the temperature sensor and the refrigerating mechanism are electrically connected to the controller.

Optionally, the refrigerating mechanism comprises: at least one of a heat exchanger and a room air conditioner.

Optionally, the groove engraving device further comprises: a cooling device for cooling the piece to be processed, wherein the cooling device is disposed inside the processing chamber, and the cooling device is provided correspondingly to the cutter.

Optionally, the cooling device is a coolant spraying mechanism.

Optionally, the groove engraving device further comprises: a temperature holding hood for holding a temperature of the piece to be processed, wherein the temperature holding hood is disposed inside the processing chamber.

Optionally, the temperature holding hood is provided with an opening, and the opening is for the cutter to pass through, to abut the cutter on at least part of the piece to be processed.

Optionally, the temperature holding hood comprises: a first hood body and a second hood body, wherein the first hood body and the second hood body are rotatably connected.

Optionally, the temperature holding hood comprises: an inner wall and an outer wall, wherein the outer wall and the inner wall form a hollow cavity there between, and a refrigerant medium for cooling the piece to be processed is provided inside the hollow cavity.

In a second aspect, an embodiment of the present disclosure further discloses a groove engraving method, wherein the groove engraving method comprises:

clamping a piece to be processed by using a clamping mechanism rotating with respect to the processing chamber;

controlling a temperature inside the processing chamber to be within a preset temperature range by using a temperature controlling device; and driving the piece to be processed at the clamping mechanism to rotate by using a driving mechanism, to engrave a groove on the piece to be processed through the cutter.

Optionally, the step of driving the piece to be processed at the clamping mechanism to rotate with respect to the processing chamber by using the driving mechanism, to engrave the groove on the piece to be processed through the cutter comprises:

controlling the cutter to advance, wherein an advancing depth of the cutter is 0.16-0.28 mm;

driving the piece to be processed at the clamping mechanism to rotate with respect to the processing chamber by using the driving mechanism, to engrave a groove on the piece to be processed through the cutter; and controlling the cutter to retract.

Optionally, the step of driving the piece to be processed at the clamping mechanism to rotate with respect to the processing chamber by using the driving mechanism, to engrave the groove on the piece to be processed through the cutter further comprises:

ejecting a coolant to a groove-engraving position of the piece to be processed by using a cooling device.

Optionally, the step of controlling the temperature inside the processing chamber to be within the preset temperature range by using the temperature controlling device comprises:

detecting the temperature inside the processing chamber by using a temperature sensor; and controlling a refrigerating mechanism to regulate the temperature inside the processing chamber to the preset temperature range, in the case of the temperature is not within the preset temperature range.

The embodiments of the present disclosure have the following advantages:

In the embodiments of the present disclosure, the clamping mechanism for clamping the piece to be processed and the cutter for engraving groove on the piece to be processed are both disposed inside the processing chamber, and the temperature controlling device could control the temperature inside the processing chamber to be within the preset temperature range when the cutter is to be used to engrave a groove on the piece to be processed, whereby the temperature of the environment for the piece to be processed is within the preset temperature range. Because the piece to be processed has a higher hardness within the preset temperature range, it is easy for the cutter to perform the groove engraving on the piece to be processed, which could prevent remaining of the swarf in the groove, and improve the effect of the groove engraving. Furthermore, the driving mechanism could drive the piece to be processed to rotate via the clamping mechanism, so that the groove on the piece to be processed could be formed in one step, which can improve the processing efficiency and the processing quality of the groove engraving on the piece to be processed.

BRIEF DESCRIPTION OF THE DRAWINGS

FIG. 5 is a schematic structural diagram in another direction of FIG. 2 of the present disclosure;

FIG. 6 is a flow chart of the steps of a groove engraving method according to the present disclosure.

DESCRIPTION OF THE REFERENCE NUMBERS

1—cutter, 2—piece to be processed, 3—temperature holding hood, 31—opening, 32—first hood body, 33—second hood body, 34—connector, 35—inner wall, and 36—outer wall.

Detailed Description of the Embodiments

In order to make the above purposes, features and advantages of the present disclosure more apparent and understandable, the present disclosure will be described in further detail below with reference to the drawings and the particular embodiments.

Figure 1:
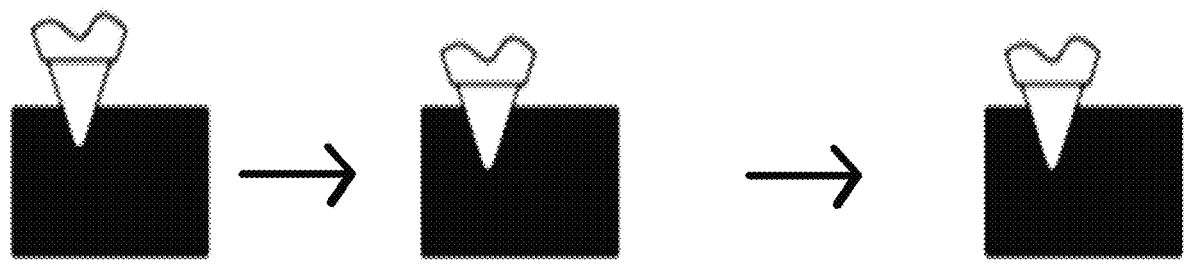
FIG. 1 is a schematic diagram of the processing flow of an accommodation groove in the prior art.
Figure 2:
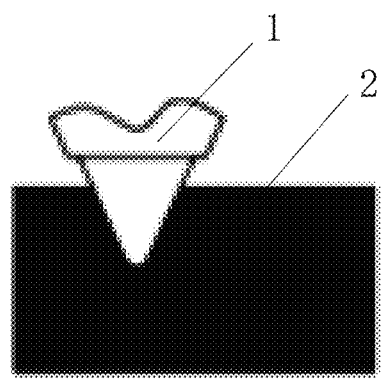
FIG. 2 is a schematic structural diagram of the groove engraving on a piece to be processed by the cutter according to the present disclosure.

One of the core concepts of the embodiments of the present disclosure is to provide a groove engraving device. As shown in FIG. 2, FIG. 2 shows a schematic structural diagram of the groove engraving on a piece to be processed by the cutter according to the present disclosure. Particularly, the groove engraving device comprises: a processing chamber for containing a piece to be processed 2, a cutter 1 for groove engraving on the piece to be processed 2, a clamping mechanism for clamping the piece to be processed 2 and a driving mechanism for driving the clamping mechanism to rotate, wherein the clamping mechanism and the cutter 1 are both disposed inside the processing chamber, and the clamping mechanism is rotatable with respect to the processing chamber; and the groove engraving device further comprises: a temperature controlling device for controlling a temperature inside the processing chamber to be within a preset temperature range, wherein the temperature controlling device is disposed inside the processing chamber.

In the embodiment of the present disclosure, the clamping mechanism for clamping the piece to be processed 2 and the cutter 1 for groove engraving on the piece to be processed 2 are both disposed inside the processing chamber, and when the cutter 1 is engraving a groove on the piece to be processed 2, the temperature controlling device could control the temperature inside the processing chamber to be within the preset temperature range, whereby the temperature of the environment for the piece to be processed 2 is within the preset temperature range. Because the piece to be processed 2 has a higher hardness within the preset temperature range, it is easy for the cutter 1 to perform the groove engraving on the piece to be processed 2, which could prevent remaining of the swarf in the groove, and improve the effect of the groove engraving. Furthermore, the driving mechanism could drive the piece to be processed 2 to rotate via the clamping mechanism, so that the groove on the piece to be processed 2 could be formed in one step, which could improve the processing efficiency and the processing quality of the groove engraving on the piece to be processed 2.

The processing chamber according to the embodiment of the present disclosure is used to contain and connect to the clamping mechanism, the cutter 1 and the temperature controlling device, and may be a main device body or a processing machine tool of the groove engraving device. In practical applications, when the cutter 1 is used for engraving a groove on the piece to be processed 2, the piece to be processed 2 may be connected in the processing chamber, and the temperature controlling device can control the temperature inside the processing chamber to be within the preset temperature range, so that the piece to be processed 2 could always be in an environment within the preset temperature range during the process of engraving groove to maintain a higher hardness.

Particularly, the clamping mechanism is rotatable with respect to the processing chamber. Accordingly, when the piece to be processed 2 is inside the processing chamber and being engraved a groove, the driving mechanism could drive the piece to be processed 2 to rotate via the clamping mechanism, which can increase the speed of the groove engraving on the piece to be processed 2 by the cutter 1. In practical applications, because a higher hardness of the piece to be processed 2, the piece to be processed 2 has been driven to rotate with one cycle by the driving mechanism via the clamping mechanism, the cutter 1 could complete the groove engraving on the piece to be processed 2, whereby the groove engraving has a higher speed, and the groove could be formed in one step.

The driving mechanism according to the embodiment of the present disclosure is used to provide a power source, and may include at least one of hydraulic driving, pneumatic driving, electric driving and mechanical driving, which may be particularly configured according to practical demands, and is not particularly limited in the embodiments of the present disclosure.

The cutter 1 according to the embodiment of the present disclosure may be a V-shaped cutter or a U-shaped cutter. In practical applications, when the cutter 1 is a V-shaped cutter, a V-shaped groove can be engraved on the piece to be processed 2, and when the cutter 1 is a U-shaped cutter, a U-shaped groove can be engraved on the piece to be processed 2. The cutter 1 may be provided particularly according to the actual requirement of the groove shape, and is not particularly limited in the embodiments of the present disclosure.

Further, the structure of the cutter 1 may be designed symmetrically to allow a good symmetry of the groove shape on the piece to be processed 2, to arrange the diamond wire.

The preset temperature range according to the embodiment of the present disclosure is a low-temperature environment, which may be particularly configured according to practical demands, and is not particularly limited in the embodiments of the present disclosure.

Particularly, the temperature of the interior of the processing chamber may be controlled to be always a constant low-temperature environment through the controlling device.

The clamping mechanism according to the embodiment of the present disclosure is a mechanism for clamping and fixing the piece to be processed 2, and may be of a combined structure formed by gears and racks or a clamping-jaw structure, which may be particularly configured according to practical demands, and is not particularly limited in the embodiments of the present disclosure.

Optionally, the piece to be processed 2 may be a home roll, an auxiliary roll and so on, which is not particularly limited in the embodiments of the present disclosure. In practical applications, the home roll generally comprises: a home-roll main body and a coating layer coating the home-roll main body, wherein the coating layer may be the material having a higher hardness in a low-temperature environment, such as polyurethane resin and polytetrafluoroethylene.

The following description is given as an example in which the cutter 1 engraves a groove on a home roll:

the first step: mounting the home roll to the clamping mechanism inside the processing chamber;

the second step: regulating the temperature inside the processing chamber to the preset temperature range by using the temperature controlling device;

the third step: regulating the cutter 1 to face at least part of the home roll;

the fourth step: regulating the cutter 1 to advance, to insert into the coating layer of the home roll;

the fifth step: driving the home roll to rotate by one cycle by the driving mechanism via the clamping mechanism, to engrave a groove on the coating layer of the home roll with the cutter 1;

the sixth step: regulating the cutter 1 to retract, to complete the groove engraving on the home roll; and the seven step: regulating the cutter 1 to face the other part of the home roll, and repeating the above first to sixth steps, to perform the next groove engraving.

As shown in FIG. 2, the cutter 1 can complete the groove engraving in one time of advancing, which lasts approximately 3.5 seconds, could save a half of the time and double the processing efficiency compare with the groove-engraving modes in the prior art.

By the above-described mode of the groove engraving on the home roll, it can spend a shorter time, and is not easy to remain the swarf between the grooves, and the groove has a better effect of formation. Accordingly, in practical applications, it is easy to arrange a diamond wire in the groove on the home roll, which can prevent jumping of the diamond wire, and improve the slicing efficiency and the slicing quality of the diamond wire.

Optionally, the preset temperature range is from minus 10 degrees Celsius to minus 4 degrees Celsius. In practical applications, the piece to be processed 2 has a higher hardness within the temperature range from minus 10 degrees Celsius to minus 4 degrees Celsius, which can prevent remaining of the swarf in the groove, to obtain better effect and efficiency of the groove engraving.

Particularly, when polyurethane resin is at a temperature less than minus 10 degrees Celsius, the coating layer of the home roll is affected by the low temperature and has a high shrinkage, and after completion of the groove engraving and a recovery of the temperature to room temperature, the shape and the size of the groove might have a large variation easily, which affects the arrangement of the diamond wire, and is adverse to the slicing. Moreover, when polyurethane resin is at a temperature greater than minus 4 degrees Celsius, the coating layer of the home roll has a lower hardness, polyurethane-resin glue wires remain in the groove easily, and the surface of the home roll is made unclean easily, which might affect the arrangement of the diamond wire. However, in the embodiment of the present disclosure, the preset temperature range is controlled at minus 10 degrees Celsius to minus 4 degrees Celsius, which cannot only remove the polyurethane-resin glue wires in the groove thoroughly, to improve the effect of the groove engraving, but also can prevent a large variation of the groove shape after the recovery of the temperature to room temperature.

In an alternative embodiment of the present disclosure, the temperature controlling device may comprise: a temperature sensor for detecting the temperature inside the processing chamber, a refrigerating mechanism for regulating the temperature inside the processing chamber and a controller for controlling the refrigerating mechanism to operate; and all of the temperature sensor, the refrigerating mechanism and the controller are disposed inside the processing chamber, and the temperature sensor and the refrigerating mechanism are electrically connected to the controller.

In the embodiment of the present disclosure, the temperature sensor may detect the temperature inside the processing chamber, and send the detected temperature value to the controller. The controller, after receiving the temperature value, controls the operation of the refrigerating mechanism, to facilitate the temperature controlling device to control the temperature inside the processing chamber to be within the preset temperature range.

Particularly, the temperature sensor refers to a sensor that can sense the temperature and convert the temperature to a usable output signal. Temperature sensors are the core part of temperature measuring meters, and have many types. Temperature sensors may be classified, according to the measurement modes, into a contacting type and a non-contacting type, and, according to the sensor materials and the electronic-element characteristics, into a thermal-resistor type and a thermocouple type. The type of the temperature sensor is not particularly limited in the embodiments of the present disclosure, and may be particularly configured according to practical demands.

Particularly, the controller refers to a master device that controls the starting up, speed regulation, braking and reversing of an electric motor by changing the wiring of the main circuit or the control circuit and changing the resistance value in the electric circuit with a preset sequence. The controller is formed by a program counter, an instruction register, an instruction decoder, a timing generator and an operation controller. The controller is the "decision making mechanism" for issuing commands; in other words, it completes the operation of coordinating and commanding the entire computer system. Controllers may be classified into combinatorial-logic controllers and microprogram controllers. The type of the controller is not particularly limited in the embodiments of the present disclosure, and may be particularly configured according to practical demands.

As an example, the temperature sensor detects that the temperature of the processing chamber is 0 degree Celsius, and sends the information to the controller that the temperature value is 0 degree Celsius. The controller determines that the current temperature value is greater than minus 4 degrees Celsius. The controller regulates the refrigerating mechanism to start up refrigeration or intensify refrigeration, to cause the current temperature value to be within the temperature range from minus 10 degrees Celsius to minus 4 degrees Celsius.

Alternatively, the temperature sensor detects that the temperature of the processing chamber is minus 5 degrees Celsius, and sends the information to the controller that the temperature value is minus 5 degrees Celsius. The controller determines that the current temperature value is within the temperature range from minus 10 degrees Celsius to minus 4 degrees Celsius. The controller controls the refrigerating mechanism to maintain the current operation state.

Optionally, the refrigerating mechanism may include: at least one of a heat exchanger and a room air conditioner. In practical applications, the heat exchanger can, by means of heat exchange, regulate the temperature inside the processing chamber to maintain within the temperature range from minus 10 degrees Celsius to minus 4 degrees Celsius, and the room air conditioner can, by means of forced refrigeration, regulate the temperature inside the processing chamber to maintain within the temperature range from minus 10 degrees Celsius to minus 4 degrees Celsius.

Particularly, the heat exchanger (also known as a heat exchange equipment) refers to a device that causes heat to be transferred from a hot fluid to a cold fluid, to satisfy prescribed process requirements, and it is an industrial application of convective heat transfer and thermal conduction. Heat exchangers may be classified in different ways. According to their operational processes, they may be classified into a dividing wall type, a mixed type and a heat accumulating type (or referred to as a recuperative type). According to their degrees of surface compactness, they may be classified into a compact type and an incompact type. The type of the heat exchanger is not particularly limited in the embodiments of the present disclosure, and may be particularly configured according to practical demands.

Particularly, the room air conditioner refers to a device that treats the temperature, the humidity, the purity and the flow rate of air, to satisfy the requirements by production and living, and is referred to for short as an "air conditioner". The room air conditioner is a machine set used to provide temperature change of the treated air for a spatial area (generally, a sealed one). Its function is to regulate the parameters, such as the temperature, the humidity, the purity and the flow rate, of the air inside the room (or a closed space and area), to satisfy the requirements by the technical process. The type of the room air conditioner is not particularly limited in the embodiments of the present disclosure, and may be particularly configured according to practical demands.

In another alternative embodiment of the present disclosure, the groove engraving device may further comprise: a cooling device for cooling the piece to be processed 2, wherein the cooling device is disposed inside the processing chamber, and the cooling device is provided correspondingly to the cutter 1.

In the embodiment of the present disclosure, when the cutter 1 is engraving a groove on the piece to be processed 2, the cooling device may be used to cool the piece to be processed 2, which can further ensure that the piece to be processed 2 is within the preset temperature range, to improve the effect and the efficiency of the groove engraving on the piece to be processed 2.

In practical applications, the cutter 1 may engrave a groove at a processing region of the piece to be processed 2, the cooling device may face the processing region of the piece to be processed 2, and the cooling device may be used to cool the processing region of the piece to be processed 2, to ensure the hardness of the processing region of the piece to be processed 2, and improve the effect of the groove engraving at the processing region of the piece to be processed 2.

Optionally, the cooling device may be a coolant spraying mechanism. In practical applications, the coolant spraying mechanism may cool the piece to be processed 2 in real time, to ensure that the piece to be processed 2 is always within the preset temperature range during the groove engraving.

Particularly, the coolant spraying mechanism may automatically spray a coolant to the processing region of the piece to be processed 2, whereby the coolant cannot only cool the processing region of the piece to be processed 2, but also can wash off the swarf at the processing region of the piece to be processed 2.

Optionally, the coolant may be an industrial liquid for cooling and lubricating the cutter 1 and the piece to be processed 2, may be obtained by scientifically formulating multiple super-high-function agents, has excellent cooling performance, lubricating performance, rust protection performance, de-oiling and washing function and anticorrosion function, and can be easily diluted. It may particularly include at least one of an emulsion, a semisynthetic cutting fluid and a fully synthetic cutting fluid, and the coolant may also be an antifreezing solution or dry ice, which may be particularly configured according to practical demands, and is not particularly limited in the embodiments of the present disclosure.

In yet another alternative embodiment of the present disclosure, the groove engraving device may further comprise: a temperature holding hood 3 for holding the temperature of the piece to be processed 2, wherein the temperature holding hood 3 may be disposed inside the processing chamber.

In the embodiment of the present disclosure, the temperature holding hood 3 may cover the piece to be processed 2 to lock the temperature, to better control the piece to be processed 2 to maintain within the preset temperature range.

Particularly, the temperature holding hood 3 may be of a circular-arc-shaped structure or a rhombic structure, which may be particularly configured according to practical demands, and is not particularly limited in the embodiments of the present disclosure.

Figure 3:
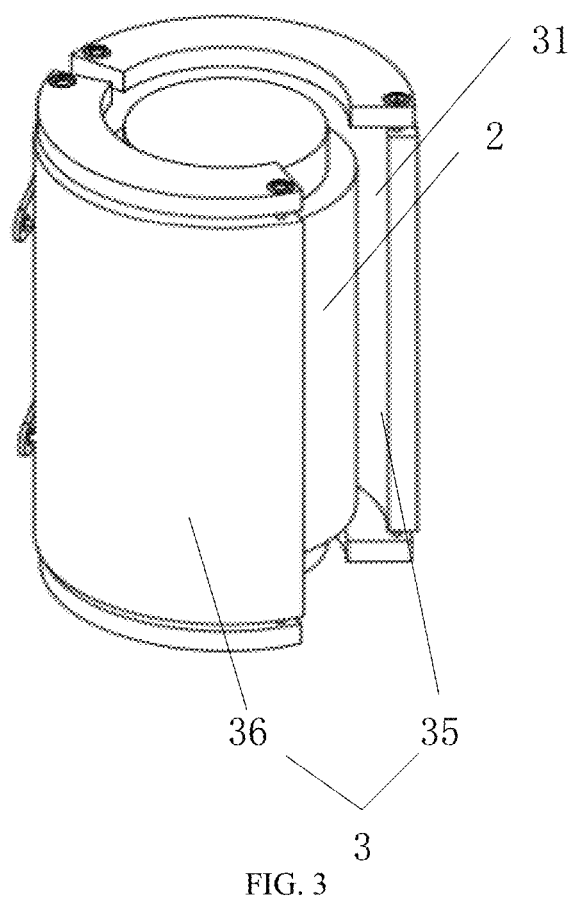
FIG. 3 is a schematic structural diagram of the interior of a processing chamber according to the present disclosure.

As shown in FIG. 3, the temperature holding hood 3 may cover the exterior of the piece to be processed 2, which may be particularly configured according to practical demands, and is not particularly limited in the embodiments of the present disclosure.

As shown in FIG. 3, the temperature holding hood 3 may be provided with an opening 31, and the opening 31 may be for the cutter 1 to pass through, to cause the cutter 1 to abut at least part of the piece to be processed 2.

In the embodiment of the present disclosure, the opening 31 of the temperature holding hood 3 may face the cutter 1. Accordingly, the cutter 1 may pass through the opening 31 and contact the piece to be processed 2, to complete the groove engraving on the piece to be processed 2.

Figure 4:
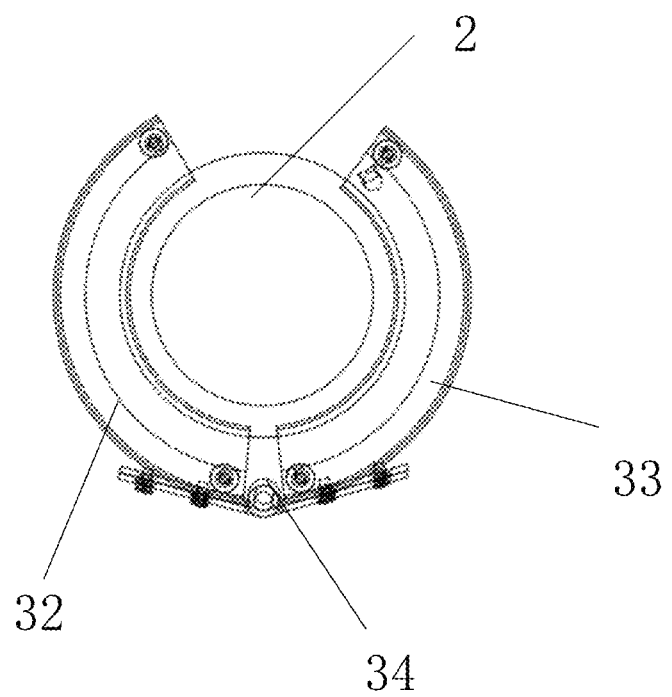
FIG. 4 is a schematic structural diagram in a certain direction of FIG. 2 of the present disclosure.

As shown in FIG. 4, the temperature holding hood 3 may comprise: a first hood body 32 and a second hood body 33, wherein the first hood body 32 and the second hood body 33 are rotatably connected.

In the embodiment of the present disclosure, the first hood body 32 and the second hood body 33 of the temperature holding hood 3 are rotatably connected, which facilitates to regulate the size of the opening 31 of the temperature holding hood 3, and in turn facilitates to cover the exterior of the piece to be processed 2 by using the temperature holding hood 3, to holding the temperature of the piece to be processed 2.

Particularly, the first hood body 32 and the second hood body 33 may realize the rotatable connection by using a connector 34. The connector 34 may be of a bolt structure or a hinge structure. As shown in FIG. 5, FIG. 5 shows a case in which the connector 34 is of a hinge structure, and other cases may refer to that, and is not particularly limited in the embodiments of the present disclosure.

Further, a hinge is formally referred to as a gemel, is generally of a two-fold type, and is a component that connects two parts of an object and enables them to move. The hinge may include a powder-coated washer hinge, a powder-coated nylon hinge, a copper imitation washer hinge, a silver imitation washer hinge and so on, which is not particularly limited in the embodiments of the present disclosure.

In practical applications, the first hood body 32 and the second hood body 33 may be detachably connected. The first hood body 32 and the second hood body 33 of the temperature holding hood 3 may firstly cover the exterior of the piece to be processed 2, and the first hood body 32 and the second hood body 33 may be fastened by using a fastener, whereby the temperature holding hood 3 covers the piece to be processed 2 to lock the temperature.

Optionally, the temperature holding hood 3 may further comprise: an inner wall 35 and an outer wall 36, wherein the outer wall 36 and the inner wall 35 form a hollow cavity therebetween, and a refrigerant medium for cooling the piece to be processed 2 is provided inside the hollow cavity.

In the embodiment of the present disclosure, by providing the refrigerant medium inside the hollow cavity of the temperature holding hood 3, and cooling the piece to be processed 2 by using the refrigerant medium, it can be further ensured that the piece to be processed 2 is always within the preset temperature range during the groove engraving.

Particularly, the refrigerant medium may automatically spray a coolant to the processing region of the piece to be processed 2, whereby the refrigerant medium cannot only cool the processing region of the piece to be processed 2, but also can wash off the swarf at the processing region of the piece to be processed 2.

Optionally, the refrigerant medium is an industrial liquid for cooling and lubricating the cutter 1 and the piece to be processed 2, may be obtained by scientifically formulating multiple super-high-function agents, has excellent cooling performance, lubricating performance, rust protection performance, de-oiling and washing function and anticorrosion function, and can be easily diluted. It may particularly include at least one of an emulsion, a semisynthetic cutting fluid and a fully synthetic cutting fluid, and the coolant may also be an antifreezing solution or dry ice, which may be particularly configured according to practical demands, and is not particularly limited in the embodiments of the present disclosure.

The groove engraving device according to the embodiments of the present disclosure has at least the following advantages:

In the embodiments of the present disclosure, the clamping mechanism for clamping the piece to be processed and the cutter for groove engraving on the piece to be processed are both disposed inside the processing chamber, and when the cutter is used to engrave a groove on the piece to be processed, the temperature inside the processing chamber could be controlled within the preset temperature range by the temperature controlling device, whereby the temperature of the environment for the piece to be processed is within the preset temperature range. Because the piece to be processed has a higher hardness within the preset temperature range, it is easy for the cutter to perform the groove engraving on the piece to be processed, which could prevent remaining of the swarf in the groove, and improve the effect of the groove engraving. Furthermore, the driving mechanism could drive the piece to be processed to rotate via the clamping mechanism, so that the groove on the piece to be processed could be formed in one step, which can improve the processing efficiency and the processing quality of the groove engraving on the piece to be processed.

Referring to FIG. 6, FIG. 6 shows a flow chart of the steps of the groove engraving method according to an embodiment of the present disclosure.

The groove engraving method according to the embodiment of the present disclosure may particularly comprise the following steps:

Step 101: clamping a piece to be processed by using a clamping mechanism rotating with respect to the processing chamber.

The processing chamber may be a main device body or a processing machine tool of the groove engraving device, and the clamping mechanism and the piece to be processed may be both disposed inside the processing chamber.

The clamping mechanism may be a mechanism for clamping and fixing the piece to be processed, and the clamping mechanism may drive the piece to be processed to rotate. The clamping mechanism may be of a combined structure formed by gears and racks or a clamping-jaw structure, which may be particularly configured according to practical demands, and is not particularly limited in the embodiments of the present disclosure.

The piece to be processed may be a home roll, an auxiliary roll and so on, which is not particularly limited in the embodiments of the present disclosure. In practical applications, the home roll generally comprises: a home-roll main body and a coating layer coating the home-roll main body, wherein the coating layer may employ the material having a higher hardness in a low-temperature environment, such as polyurethane resin and polytetrafluoroethylene.

Step 102: controlling a temperature inside the processing chamber to be within a preset temperature range by using a temperature controlling device.

The temperature controlling device can control the temperature inside the processing chamber to be within the preset temperature range, so that the piece to be processed can always be in an environment within the preset temperature range, to maintain a higher hardness.

The preset temperature range may be a low-temperature environment, wherein the piece to be processed has a higher hardness in the low-temperature environment. The preset temperature range may be set according to practical applications, and is not particularly limited in the embodiments of the present disclosure.

Step 103: driving the piece to be processed at the clamping mechanism to rotate by using a driving mechanism, to engrave a groove on the piece to be processed through the cutter.

The driving mechanism is used to provide a power source, and may include at least one of hydraulic driving, pneumatic driving, electric driving and mechanical driving, which may be particularly configured according to practical demands, and is not particularly limited in the embodiments of the present disclosure.

The cutter may be a V-shaped cutter or a U-shaped cutter. In practical applications, when the cutter is a V-shaped cutter, a V-shaped groove can be engraved on the piece to be processed, and when the cutter is a U-shaped cutter, a U-shaped groove can be engraved on the piece to be processed. The cutter may be particularly provided according to the groove shape actually required, and is not particularly limited in the embodiments of the present disclosure.

Optionally, the cutter may be of a symmetrical structure, whereby the groove shape on the piece to be processed has a good symmetry, to facilitate the arrangement of a diamond wire.

In the embodiments of the present disclosure, the clamping mechanism for clamping the piece to be processed and the cutter for groove engraving on the piece to be processed are both disposed inside the processing chamber, and the temperature controlling device can control the temperature inside the processing chamber to be within the preset temperature range, so that, during the groove engraving on the piece to be processed by the cutter, the piece to be processed can always be in an environment within the preset temperature range, to maintain a higher hardness, which facilitates the cutter to perform the groove engraving on the piece to be processed, which can prevent remaining of the swarf in the groove, and improve the effect of the groove engraving. Furthermore, the driving mechanism can drive the piece to be processed to rotate via the clamping mechanism, so that the groove on the piece to be processed can be formed in one step, which can improve the processing efficiency and the processing quality of the groove engraving on the piece to be processed.

Figure 7:
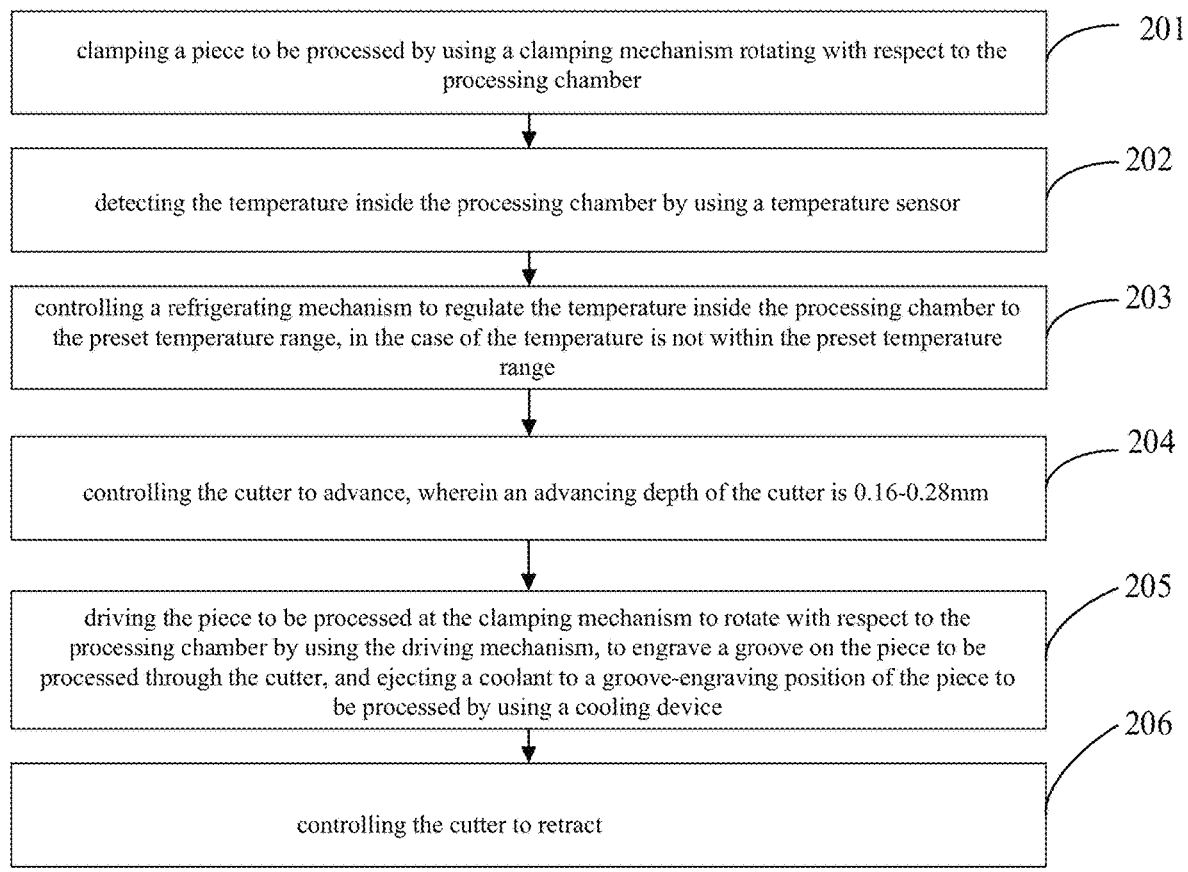
FIG. 7 is a flow chart of the steps of another groove engraving method according to the present disclosure.

Referring to FIG. 7, FIG. 7 shows a flow chart of the steps of the groove engraving method according to another embodiment of the present disclosure. The method may particularly comprise:

Step 201: clamping a piece to be processed by using a clamping mechanism rotating with respect to the processing chamber.

The step 201 may refer to the step 101, and is not discussed here further.

Step 202: detecting the temperature inside the processing chamber by using a temperature sensor.

The temperature sensor is disposed inside the processing chamber, and can detect the temperature value inside the processing chamber in real time.

Particularly, the temperature sensor refers to a sensor that can sense the temperature and convert the temperature to a usable output signal. Temperature sensors are the core part of temperature measuring meters, and have many types. Temperature sensors may be classified, according to the measurement modes, into a contacting type and a non-contacting type, and, according to the sensor materials and the electronic-element characteristics, into a thermal-resistor type and a thermocouple type. The type of the temperature sensor is not particularly limited in the embodiments of the present disclosure, and may be particularly configured according to practical demands.

Step 203: controlling a refrigerating mechanism to regulate the temperature inside the processing chamber to the preset temperature range, in the case of the temperature is not within the preset temperature range.

The preset temperature range may be from minus 10 degrees Celsius to minus 4 degrees Celsius, wherein the piece to be processed has a higher hardness within the temperature range from minus 10 degrees Celsius to minus 4 degrees Celsius. If the temperature is less than minus 10 degrees Celsius or greater than minus 4 degrees Celsius, the refrigerating mechanism is controlled to regulate the temperature inside the processing chamber, to cause the temperature inside the processing chamber to maintain within the preset temperature range.

The refrigerating mechanism may comprise: at least one of a heat exchanger and a room air conditioner. Particularly, the heat exchanger can regulate the temperature inside the processing chamber by means of heat exchange. The heat exchanger (also known as a heat exchange equipment) refers to a device that causes heat to be transferred from a hot fluid to a cold fluid, to satisfy prescribed process requirements, and it is an industrial application of convective heat transfer and thermal conduction. Heat exchangers may be classified in different ways. According to their operational processes, they may be classified into a dividing wall type, a mixed type and a heat accumulating type (or referred to as a recuperative type). According to their degrees of surface compactness, they may be classified into a compact type and an incompact type.

Particularly, the room air conditioner can regulate the temperature inside the processing chamber by means of forced refrigeration. The room air conditioner refers to a device that treats the temperature, the humidity, the purity and the flow rate of air, to satisfy the requirements by production and living, and is referred to for short as an "air conditioner". The room air conditioner is a machine set used to provide temperature change of the treated air for a spatial area (generally, a sealed one). Its function is to regulate the parameters, such as the temperature, the humidity, the purity and the flow rate, of the air inside the room (or a closed space and area), to satisfy the requirements by the technical process. The type of the room air conditioner is not particularly limited in the embodiments of the present disclosure, and may be particularly configured according to practical demands.

Step 204: controlling the cutter to advance, wherein an advancing depth of the cutter is 0.16-0.28 mm.

Before the advancing of the cutter, the cutter may be firstly regulated to at least partially face the piece to be processed. Subsequently, the cutter is controlled to advance, to cause the cutter to insert into the piece to be processed.

Particularly, the cutter can advance for one time, wherein the depth of one time of the advancing of the cutter may be 0.16-0.28 mm (millimeters). Accordingly, the groove depth of the groove engraving on the piece to be processed by the cutter can reach 0.16-0.28 mm.

Particularly, the cutter is merely required to advance for one time, so that the groove on the piece to be processed can be formed in one step. In practical applications, the duration for which the cutter engraves a single groove is approximately 3.5 seconds, which, as compared with the prior art, could save a half of the time and double the efficiency.

Step 205: driving the piece to be processed at the clamping mechanism to rotate with respect to the processing chamber by using the driving mechanism, to engrave a groove on the piece to be processed through the cutter, and ejecting a coolant to a groove-engraving position of the piece to be processed by using a cooling device.

The driving mechanism is used to drive the clamping mechanism to rotate. The driving mechanism is used to provide a power source, and may include at least one of hydraulic driving, pneumatic driving, electric driving and mechanical driving, which may be particularly configured according to practical demands, and is not particularly limited in the embodiments of the present disclosure.

The clamping mechanism is used to clamp the piece to be processed, and during the driving of the clamping mechanism by the driving mechanism to rotate, the clamping mechanism can drive the piece to be processed to rotate with respect to the processing chamber.

Particularly, during the rotation of the piece to be processed with respect to the processing chamber, the cutter may be fixed with respect to the processing chamber, and the cutter may engrave a groove on the piece to be processed.

Optionally, when the cutter is engraving a groove on the piece to be processed, the cooling device may be used to eject a coolant to a groove-engraving position of the piece to be processed, to reduce the temperature of the groove-engraving position of the piece to be processed, to ensure the hardness of the piece to be processed.

The cooling device can cool the piece to be processed in real time, to ensure that the piece to be processed is always within the preset temperature range during the groove engraving. The cooling device may be a coolant spraying mechanism.

Particularly, the coolant spraying mechanism may automatically spray a coolant to the groove-engraving position of the piece to be processed, whereby the coolant cannot only cool the groove-engraving position of the piece to be processed, but also can wash off the swarf at the groove-engraving position of the piece to be processed.

Step 206: controlling the cutter to retract.

Particularly, after the groove engraving has completed, the driving mechanism is controlled to stop the operation, and the cutter is controlled to retract.

In the embodiments of the present disclosure, both of the clamping mechanism for clamping the piece to be processed and the cutter for groove engraving on the piece to be processed are disposed inside the processing chamber, and the temperature controlling device can control the temperature inside the processing chamber to be within the preset temperature range, so that, during the groove engraving on the piece to be processed by the cutter, the piece to be processed can always be in an environment within the preset temperature range, to maintain a higher hardness, it is easy to the cutter to perform the groove engraving on the piece to be processed, which can prevent remaining of the swarf in the groove, and improve the effect of the groove engraving. Furthermore, the driving mechanism can drive the piece to be processed to rotate via the clamping mechanism, so that the groove on the piece to be processed can be formed in one step, which can improve the processing efficiency and the processing quality of the groove engraving on the piece to be processed.

It should be noted that the embodiments of the description are described in the mode of progression, each of the embodiments emphatically describes the differences from the other embodiments, and the same or similar parts of the embodiments may refer to each other.

Although preferable embodiments of the embodiments of the present disclosure have been described, once a person skilled in the art has known the essential inventive concept, he may make further variations and modifications on those embodiments. Therefore, the appended claims are intended to be interpreted as including the preferable embodiments and all of the variations and modifications that fall within the scope of the embodiments of the present disclosure.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "comprising a . . . " does not exclude additional same element in the process, method, article or terminal device comprising the element.

The groove engraving device according to the present disclosure has been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

What is claimed is:

1. A groove engraving device, comprising:
   a processing chamber for containing a piece to be processed,
   a cutter for groove engraving on the piece to be processed,
   a clamping mechanism for clamping the piece to be processed,
   a driving mechanism for driving the clamping mechanism to rotate, and
   a temperature controlling device for controlling a temperature inside the processing chamber to be within a preset temperature range, wherein the temperature controlling device comprises:
   a temperature sensor for detecting the temperature inside the processing chamber, a refrigerating mechanism for regulating the temperature inside the processing chamber, and a controller for controlling the refrigerating mechanism to operate;

wherein the temperature sensor, the refrigerating mechanism and the controller are disposed inside the processing chamber, and the temperature sensor and the refrigerating mechanism are electrically connected to the controller;

wherein the clamping mechanism and the cutter are disposed inside the processing chamber, and the clamping mechanism is rotatable with respect to the processing chamber; and the temperature controlling device is disposed inside the processing chamber.

2. The groove engraving device according to claim 1, wherein the preset temperature range is from minus 10 degrees Celsius to minus 4 degrees Celsius.

3. The groove engraving device according to claim 1, wherein the refrigerating mechanism comprises at least one selected from the group consisting of a heat exchanger and a room air conditioner.

4. The groove engraving device according to claim 1, further comprising a cooling device for cooling the piece to be processed, wherein the cooling device is disposed inside the processing chamber, and the cooling device is provided correspondingly to the cutter.

5. The groove engraving device according to claim 4, wherein the cooling device is a coolant spraying mechanism.

6. The groove engraving device according to claim 1, further comprising a temperature holding hood for holding a temperature of the piece to be processed, wherein the temperature holding hood is disposed inside the processing chamber.

7. The groove engraving device according to claim 6, wherein the temperature holding hood is provided with an opening, and the opening is for the cutter to pass through, to abut the cutter on at least part of the piece to be processed.

8. The groove engraving device according to claim 6, wherein the temperature holding hood comprises a first hood body and a second hood body, wherein the first hood body and the second hood body are rotatably connected.

9. The groove engraving device according to claim 6, wherein the temperature holding hood comprises an inner wall and an outer wall, wherein a hollow cavity is formed between the outer wall and the inner wall, and a refrigerant medium for cooling the piece to be processed is provided inside the hollow cavity.

10. A groove engraving method using the groove engraving device according to claim 1, comprising:

clamping a piece to be processed by using the clamping mechanism rotating with respect to the processing chamber;

controlling a temperature inside the processing chamber to be within a preset temperature range by using the temperature controlling device; and driving the piece to be processed at the clamping mechanism to rotate with respect to the processing chamber by using the driving mechanism, to engrave a groove on the piece to be processed through the cutter.

11. The groove engraving method according to claim 10, wherein the step of driving the piece to be processed at the clamping mechanism to rotate with respect to the processing chamber by using the driving mechanism, to engrave the groove on the piece to be processed through the cutter comprises:

controlling the cutter to advance, wherein an advancing depth of the cutter is 0.16-0.28 mm;

driving the piece to be processed at the clamping mechanism to rotate with respect to the processing chamber by using the driving mechanism, to engrave the groove on the piece to be processed through the cutter; and controlling the cutter to retract.

12. The groove engraving method according to claim 11, wherein the step of driving the piece to be processed at the clamping mechanism to rotate with respect to the processing chamber by using the driving mechanism, to engrave the groove on the piece to be processed through the cutter further comprises:

ejecting a coolant to a groove-engraving of the piece to be processed by using a cooling device.

13. The groove engraving method according to claim 10, wherein the step of controlling the temperature inside the processing chamber to be within the preset temperature range by using the temperature controlling device comprises:

detecting the temperature inside the processing chamber by using the temperature sensor; and controlling the refrigerating mechanism to regulate the temperature inside the processing chamber to the preset temperature range, when the temperature is not within the preset temperature range.

* * * * *